United States Patent [19]

Kozlov et al.

[11] Patent Number: 4,986,237
[45] Date of Patent: Jan. 22, 1991

[54] HEAT ENGINE SPEED GOVERNOR

[75] Inventors: Anatoly V. Kozlov; Jury F. Khaimin; Grigory Y. Vainshtein, all of Leningrad; Vladimir I. Marakin, Krasnoobsk, all of U.S.S.R.

[73] Assignee: Nauchno-Proizvodstvennoe Objedinenie Po, etc., Leningrad, U.S.S.R.

[21] Appl. No.: 362,381
[22] PCT Filed: Sep. 29, 1987
[86] PCT No.: PCT/SU87/00107
   § 371 Date: May 26, 1989
   § 102(e) Date: May 26, 1989
[87] PCT Pub. No.: WO89/03078
   PCT Pub. Date: Apr. 6, 1989
[51] Int. Cl.$^5$ ............. F02D 41/14; G05D 13/62
[52] U.S. Cl. ........................... 123/352; 123/361
[58] Field of Search ............ 123/352, 361, 399

[56] References Cited

U.S. PATENT DOCUMENTS

| 2,987,054 | 6/1961 | Eddy, Jr. | 123/376 |
| 3,575,257 | 4/1971 | Wojcikowski | 123/352 |
| 4,461,254 | 7/1984 | Pfalzgraf et al. | 123/399 |
| 4,572,131 | 2/1986 | Hashimoto | 123/357 |
| 4,727,840 | 3/1988 | Nishida et al. | 123/361 |
| 4,873,957 | 10/1989 | Ueyama et al. | 123/399 |
| 4,936,274 | 6/1990 | Kozlov et al. | 123/352 |

FOREIGN PATENT DOCUMENTS

| 708065 | 1/1980 | U.S.S.R. |
| 1544246 | 4/1979 | United Kingdom |
| 8805568 | 7/1988 | World Int. Prop. O. | 123/352 |

OTHER PUBLICATIONS

Standards of Technology of "Bosch" Diesel Equipment, Mar. 16, 1984.
Friedman-Mayer Austria, Development of Electronic Speed Governor (no date).

Primary Examiner—Tony M. Argenbright
Assistant Examiner—Robert E. Mates
Attorney, Agent, or Firm—Lilling and Lilling

[57] ABSTRACT

A heat engine speed governor in which a differential mechanism has its input shaft operatively connected to a unidirectional electric motor, an input shaft connected to a heat engine and an output shaft connected to a fuel metering member of the heat engine. An electric motor speed control channel has a measuring means for measuring speed of the shaft connected to an input of a device for forming a control signal which has a master input connected to an output of a device for forming an electric motor speed control program. A means for measuring speed of the input shaft in a channel for correcting the electric motor speed in accordance with the heat engine speed is connected to a differentiating unit having an output connected to a correcting input of the device. Sensors of angular positions of the shafts in a channel for controlling position of the fuel metering member are connected to inputs of a device for determining the difference between coordinates of angular positions of the shafts having an output connected to a control input of the device, having a data input connected to the measuring means.

5 Claims, 2 Drawing Sheets

HEAT ENGINE SPEED GOVERNOR

BACKGROUND OF THE INVENTION

1. Field of the Invention

The invention relates to heat engines, and more specifically, it deals with a heat engine speed governor.

2. Description of the Related Art

Among most important characteristics of engineering standards of a machine unit incorporating a heat engine are reliability, capacity, fuel consumption, quality of performance, fuming and toxicity of exhaust gases under transient conditions, operative involvement of a driver and force applied to the accelerator pedal, adaptivity of a heat engine to different fuel grades, mountainous conditions, subzero temperatures and other characteristics. All the above-listed characteristics depend to a large degree on static and dynamic characteristics of a heat engine speed governor.

Mechanical speed governors with a flyweight (more rarely pneumatic or hydraulic) sensor member are mainly used in existing heat engines, in particular in tractor and automobile diesel engines. In addition to the ensurance of high performance of heat engine speed control, such governors should form the external and part-load speed control characteristics of fuel supply with such an accuracy that power capabilities of a heat engine could be used to the maximum extent on the one hand and specific fuel consumption, temperature, fuming and toxicity of exhaust gases and other parameters of the heat engine should not reach critical values resulting in the impairment of the engineering standards of machine units on the other hand.

For forming external and part speed control characteristics of fuel supply, various kinds of correcting devices and mechanisms are installed in mechanical speed governors. To enhance automation of heat engine control and control of a machine unit as a whole, such speed governors are provided with special electrical actuators including a reversible electric motor for adjusting speed mode of a heat engine, electromagnets for limiting and interrupting fuel supply, an electromagnetic device for enriched fuel supply during starting of a heat engine, an electrohydraulic valve for shutting-off fuel supply in a fuel supply system for an emergency stop of a heat engine.

Also known in the art are electrical heat engine speed governors featuring a wide range of capabilities in enhancing automation of a heat engine control owing to the use of an integrated electrically actuated device for controlling position of a fuel metering member of a heat engine.

The type of program of operation of a speed governor, static, dynamic and functional properties incorporated therein depend on use of a machine unit, operating conditions, nature of load, kind of operations performed by the machine unit and on a number of other factors associated with different operations to be performed by the machine unit.

Known in the art is a large class of electrical heat engine speed governors built around a positioning electric actuator with an alternating direction of armature rotation, comprising an electric actuator proper which is operatively connected to a fuel metering member of a heat engine and electrically connected to a unit for comparing current value of the heat engine speed with the desired speed, a device for forming a program of a heat engine speed control, and a unit for forming an electric actuator control signal.

The electric actuator in such speed governors may be in the form of an electric torque motor or in the form of a proportional electromagnet (cf. Proc. of Symp. "R. Bosch", FRG. Ed. Moscow, May 16, 1984. K. Tsimmerman. Standards of Technology of "Bosch" Diesel Equipment (FIGS. 17 and 22), or in the form of a step motor (cf. Proc. Symp. "Friedman-Mayer" Austria. Ed. Leningrad, Apr. 16, 1984. F. Pashke. Development of Electronic Speed Governor. pp. 4, 5, FIG. 17). The above group of electric positioning actuators with alternating direction of armature movement during control will be hereinafter referred to as electric motors.

Process of speed control in a heat engine with the above-mentioned electrical speed governors occurs in the following manner. Under steady conditions, when a heat engine speed is equal to the desired speed, there is no signal at the output of the unit comparing these speeds. Consequently, the armature of the electric motor and a fuel metering member connected thereto are in an equilibrium position corresponding to the steady load of the heat engine. When current value of the heat engine speed deviates from the desired value, e.g. upon a change in load, a signal proportional to the difference between the compared speeds appears at the output of the comparison unit and is fed, via the electric motor control signal forming unit, to the electric motor. As a result, the fuel metering member is caused to move to a new position in which the values of current and desired speeds of the heat engine become equal.

Speed governors having an electric positioning actuator are characterized by a low level of utilization of output. This is due to the fact that under steady operating conditions of a heat engine, when the fuel metering member and the electric motor armature connected thereto remain stationary, the electric motor is in an almost braking mode of its armature which is characterized by a low efficiency. In addition, the alternating direction of magnetic flux of the armature of the electric motor and a hysteresis upon remagnetization of the armature caused thereby result in the appearance of a zone of its insensitivity to magnetic flux thus lowering accuracy of control of position of the fuel metering member so that dynamic characteristics of heat engine speed control are impaired (e.g. instability of speed, overshooting and transient time) and static characteristics, i.e. external and part-load speed control characteristics of fuel supply of a heat engine are impaired as well.

As operation of the above-described speed governors is based on the proportional control law, the external and part-load speed control characteristics of fuel supply are formed with a predetermined steepness at which a stable operation of the heat engine is ensured over the whole range of speed and load conditions. Upon a change in load of the heat engine, its speed will also change accordingly. The amount of load applied to the heat engine is assessed by a measured value of deviation of speed from the preceding value upon transition from one load mode of the heat engine to another. By feeding the measured signal to a device for forming a program of the heat engine control external and part-load speed control characteristics of fuel supply can be formed. It should be noted that because of the presence of a zone of insensitivity to magnetic flux in the electric motor, accuracy in forming such characteristics is low.

To enhance quality in forming static and dynamic characteristics, such speed governors are provided with an additional channel for controlling position of the fuel metering member. Measurement of position of the fuel metering member in this channel is carried out by means of an inductive position sensor (generally capacitance, photoelectric and other position sensors can be used as well) which is directly coupled to the fuel metering member and connected, via a converter, to a device for forming a heat engine control program. Therefore, a control signal in this control channel is formed in accordance with a linear parameter, and accuracy of measurement of such a parameter using such sensors is low because of a substantial measurement error. For this reason, even the provision of the channel for controlling position of the fuel metering member does not allow external and part-load speed control characteristics to be formed with the desired accuracy.

Also known in the art is a heat engine speed governor (SU,A, 708065), comprising a differential mechanism having a first input shaft operatively connected to a unidirectional electric motor, a second input shaft driven by a heat engine, and an output shaft operatively connected to a fuel metering member of the heat engine, a channel for electric motor speed control in which a means for measuring speed of the first input shaft of the differential mechanism is connected to an input of a device for forming a control signal having its output connected to the electric motor, and a master input connected to an output of a device for forming electric motor speed control program having an input for a setting signal, and a channel for correcting the electric motor speed in accordance with the heat engine speed, in which a means for measuring speed of the second input shaft of the differential mechanism has an output connected to an input of a differentiating unit having an output connected to a correction input of the device for forming a control signal in the electric motor speed control channel.

In this speed governor, the input shafts of the differential mechanism are caused to rotate in opposite directions by the heat engine and electric motor. With equal speeds of the shafts, the output shaft of the differential mechanism and the fuel metering member connected thereto remain stationary. Upon changes in load of the heat engine or preset speed of one of the input shafts, the output shaft rotates to move the fuel metering member to a position corresponding to the new load or speed mode of the heat engine so that speeds of the input shafts become equal again. The provision of the differential mechanism in this speed governor allows a unidirectional motor to be used rather than an alternating rotation motor. The main feedback in this speed governor is formed by the mechanical transmission from the heat engine shaft to the input shaft of the differential mechanism.

The above-described speed governor featuring high reliability, low electric motor power input and simple design ensures high dynamic performance in a heat engine speed control. This is due to the fact that speed of a heat engine with the employment of this speed governor and accuracy of speed maintenance are determined by a preset speed of the electric motor and accuracy of its stabilization in the electric motor speed control channel. To enhance quality of heat engine control in transient modes, the means for measuring speed of the second input shaft of the differential mechanism is connected to the correcting input of the device for forming a control signal via the differentiating unit.

This speed governor is based on an integrating control so as to be advantageous over the above-described types of speed governors. As this speed governor incorporates a unidirectional electric motor, there is no hysteresis with the unidirectional magnetic flux in its armature. This prevents a zone of insensitivity to magnetic flux from appearing in the speed governor as was the case with the above-described speed governors so that dynamic characteristics in a heat engine speed control are better. This speed governor also has enhanced static characteristics since external and part-load speed control characteristics of fuel supply feature a zero steepness which is especially desirable when a heat engine is to be used in such machine units as diesel-electrical units, agricultural tractors and combines, and transportation vehicles.

However, when a zero steepness of the speed control characteristics is ensured in fuel supply of a heat engine using such a speed governor, it is not possible to obtain information on load of the heat engine using a deviation of its speed, hence it is not possible to form external and part-load speed control characteristics in accordance with a law depending on load of the heat engine.

SUMMARY OF THE INVENTION

The invention is based on the problem of providing a speed governor for a heat engine in which a fuel metering member position control signal is formed in accordance with a parameter which can ensure the formation of external and part-load speed control characteristics of fuel supply of a heat engine in accordance with a preset law depending on load of the heat engine.

This problem is solved by a heat engine speed governor, comprising a differential mechanism having a first input shaft operatively connected to a unidirectional electric motor, a second input shaft driven by the heat engine, and an output shaft operatively connected to a fuel metering member of the heat engine, an electric motor speed control channel in which a means for measuring speed of the first input shaft of the differential mechanism has an output connected to an input of a device for forming a control signal having its output connected to the electric motor and a master input connected to an output of a device for forming an electric motor speed control signal having an input receiving a master signal, and an electric motor speed correcting channel for correcting in accordance with the heat engine speed in which a means for measuring speed of the second input shaft of the differential mechanism has an output connected to an input of a differentiating unit having its output connected to a correcting input of the device for forming the electric motor speed control signal. According to the invention, the speed governor is provided with a channel for controlling position of the fuel metering member of the heat engine comprising angular position sensors of the first and second input shafts of the differential mechanism and having its outputs connected to inputs of a device for determining the difference between coordinates of angular positions of the first and second input shafts of the differential mechanism having an output thereof connected to a control input of the device for forming an electric motor control signal, an output of the means for measuring speed of the second input shaft of the differential mechanism being connected to a data input of the device for forming an electric motor speed control signal.

It is preferred that the device for determining the difference between coordinates of angular positions of the first and second input shafts of the differential mechanism in the heat engine speed governor comprise a unit for determining the time shift of coordinates of angular positions of the first and second input shafts of the differential mechanism and a computer having one input connected to an output of the unit for determining the time shift of coordinates of angular positions of the first and second input shafts of the differential mechanism and other inputs connected to outputs of the means for measuring speed of the first and second input shafts of the differential mechanism.

It is preferred that the computer of the heat engine speed governor comprise a multiplier and an adder having an output thereof connected to one input of the multiplier.

With sensors of angular positions of the first and second input shafts of the differential mechanism of the heat engine speed governor made in the form of pulse angular position sensors, it is preferred that the unit for determining the time shift of coordinates of angular positions of the first and second input shafts of the differential mechanism comprise a series circuit consisting of a flip-flop and a clock counter.

The heat engine speed governor forms a signal for controlling position of the fuel metering member in accordance with the difference between coordinates of angular positions of the input shafts of the differential mechanism is such that upon a change in coordinates of angular positions of its input shafts, the coordinate of the output shaft of the differential mechanism changes proportionally. As the output shaft is operatively linked with position of the fuel metering member, the latter will move to a respective position. In controlling speed of the heat engine, the fuel metering member is in a position corresponding to the heat engine load. Therefore, measuring the difference between coordinates of angular positions of the input shafts with reference to initial values of coordinates allows information on the heat engine load to be obtained.

Putting information on the heat engine load into the device for forming electric motor speed control program where information on speed of the heat engine is available makes it possible to form external and partload speed control characteristics in accordance with any law, i.e. with any steepness, so that the speed governor is universal.

During the heat engine speed control, the value of the difference between coordinates of angular positions of the input shafts of the differential mechanism continually changes. Consequently, to ensure a continuous process of formation of the fuel metering member position control signal, the difference between coordinates is measured upon every revolution of the input shaft of the differential mechanism. During this cycle, the computer of the device for determining the difference between coordinates of angular positions of the input shafts of the differential mechanism adds, in digital form, the speeds of the input shafts of the differential mechanism and multiplies the result by the time shift of coordinates of angular positions of the input shafts.

As the measurement is carried out upon every revolution of the input shaft, high frequency of measurement is ensured, and accuracy of formation of external and part-load speed control characteristics is enhanced.

Maximum approximation of these characteristics to those programmed in the device for forming electric motor speed control program is ensured by high accuracy of measurement of coordinates of angular positions of the input shafts since the system incorporates pulse position sensors which control the flip-flop of the unit for determining time shift of coordinates to drive and reset the clock counter, whereby the error of measurement of time shift of coordinates amounts to fractions of one percent. This accuracy, in combination with stability of the formed signal, which does not depend on vibrations level, temperature, humidity, electromagnetic interferences and other factors, makes it possible to form with high accuracy and in accordance with an optimum law external and part-load speed control characteristics of fuel supply. As a result, this enhances performance of a machine unit, including dynamic characteristics of heat engine speed control quality, and economic performance, fuming and toxicity of exhaust gases of the heat engine, are improved.

BRIEF DESCRIPTION OF THE DRAWINGS

The invention will now be described with reference to a specific embodiment thereof illustrated in the accompanying drawings, in which.

DESCRIPTION OF THE PREFERRED EMBODIMENT

Figure 1:
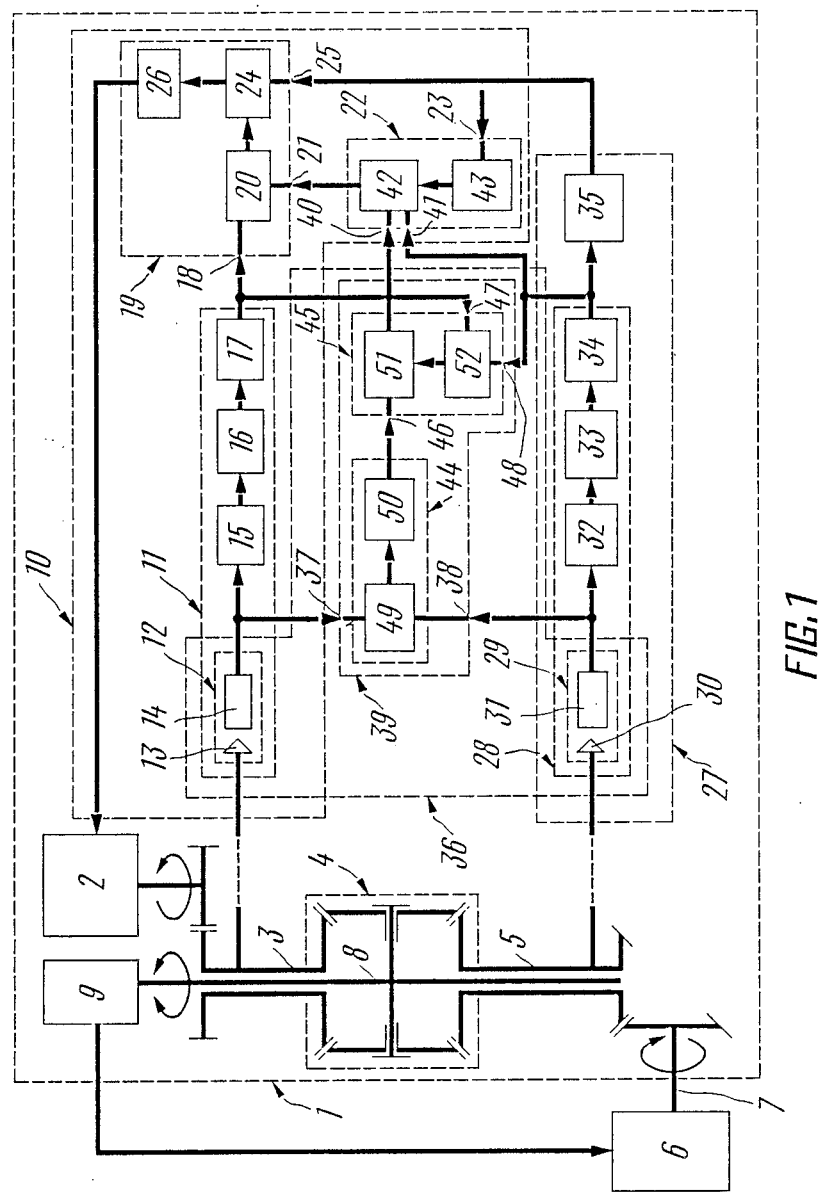
FIG. 1 is a block diagram of a heat engine speed governor according to the invention.

A heat engine speed governor 1 (FIG. 1) comprises a unidirectional electric motor 2 operatively connected to a first input shaft 3 of a differential mechanism 4. A second input shaft 5 of the differential mechanism 4 is rotated by a heat engine 6 and is operatively connected to a shaft 7 of the heat engine 6 in this embodiment. An output shaft 8 of the differential mechanism 4 is operatively connected to a fuel metering member 9 of the heat engine 6. The operative connections of the differential mechanism 4 are shown in the drawing as gearings.

The speed governor 1 also has a channel for electric motor speed control. Provided at the input of the control channel 10 is a means 11 for measuring speed of the first input shaft of the differential mechanism in which a sensor 12 of angular position of the first input shaft consists of a driver member 13 mounted on the first input shaft 3 and a generator 14 forming a pulse signal in response to cooperation with the driver member 13. The generator 14 is connected to an input of a counter-triggered flip-flop 15 which is connected to an input of a clock counter 16. An output of the clock counter 16 is connected to an input of a converter 17 converting clock pulses to angular velocity of the first input shaft of the differential mechanism. An output of the converter 17 is connected to an input 18 of a device 19 for forming a control signal. The input 18 is an input of a comparison unit 20 for comparing speed of the electric motor with the desired speed. Another input of the comparison unit 20 is a master input 21 of the device 19 for forming a control signal which is designed for putting in a preset electric motor speed signal. The input 21 is connected to an output of a device 22 for forming an electric motor speed control program having an input 23 for putting in a preset signal. An output of the comparison unit 20 is connected to one of the inputs of an adder 24 having another input which is a correcting input 25 of the device 19 for forming control signal. The adder 24 is connected to an input of a converter 26 having an output which is an output of the device 19 for forming a control signal and of the control channel 10 and which is connected to the electric motor 2. The converter 26 may be of any type and is designed for matching the control circuit of the speed governor with the electric motor 2, e.g. it may be in the form of a digital signal-to-syncs controlling switching sequence of windings of the electric motor 2.

The speed governor 1 comprises a correcting channel 27 for correcting electric motor speed in accordance with the heat engine speed, having at the input thereof a means 28 for measuring speed of the second shaft of the differential mechanism. A sensor 29 of angular position of the second input shaft in the means 28 for measuring speed consists of a driver member 30 mounted on the second input shaft 5 and a generator 31 forming a pulse signal in response to cooperation with the driver member 30. The generator 31 is connected to an input of a counter-triggered flip-flop 32 which is connected to an input of a clock counter 33. An output of the clock counter 33 is connected to an input of a converter 34 for converting clock pulses to angular velocity of the second input shaft of the differential mechanism. An output of the converter 34 is connected to an input of a differentiating unit 35 having an output which is an output of the correcting channel 27 and which is connected to the correcting input 25 of the device 19 for forming a control signal.

It is preferred that the angular position sensors 12, 29 of the input shafts of the differential mechanism be in the form of magnetoelectric and optical pulse position sensors in which driver members comprise, e.g. magnets, discs with slots or projections, and the like, mounted on the input shafts 3, 5 of the differential mechanism 4.

The speed governor 1 also comprises a channel 36 for controlling position of the fuel metering member of the heat engine having at the input thereof the sensors of angular position of the input shafts 3, 5 of the differential mechanism 4. In this embodiment of the speed governor 1 the sensors of angular position are the sensors 12, 29. The outputs of the sensors 12, 29 are connected to a first input 37 and second input 38 of a device 39 for determining the difference between coordinates of angular positions of the first and second input shafts of the differential mechanism, having an output which is an output of the control channel 36 and which is connected to a control input 40 of the device 22 for forming an electric motor speed control program which has a data input 41 connected to an output of the means 28 for measuring speed of the second shaft.

In this embodiment, the control input 40 is a first input of a comparator 42 and the data input 41 is a second input of the comparator 42 having a third input connected to a memory 43 which stores a set of programs for forming external and part-load speed control characteristics of fuel supply each corresponding to a master signal fed to the input 23 of the device 22 for forming a control program.

The device 39 for determining the difference between coordinates of angular position comprises a unit 44 for determining the time shift between coordinates of angular position of the first and second input shafts of the differential mechanism and a computer 45 having an input 46 connected to an output of the unit 44 for determining the time shift between coordinates and inputs 47, 48 connected to outputs of the means 11, 28 for measuring speeds of the first and second input shafts of the differential mechanism.

With the sensors of angular positions of the first and second input shafts 3, 5 of the differential mechanism 4 in the form of pulse angular position sensors, the unit 44 for determining the time shift between coordinates comprises a series circuit consisting of a flip-flop 49 and a clock counter 50.

The clock counters 16, 33 and 50 in the functional diagram of the speed governor 1 shown in FIG. 1 are driven simultaneously by a common clock or by their own independent clocks (not shown).

Power supply of the electric motor 2 and components of the channels 10, 27 and 36 is effected in a conventional manner by connecting them to an on-board power supply of the heat engine or to a self-contained power supply (not shown).

In this embodiment of the speed governor 1, information on speeds of the input shafts 3, 5 of the differential mechanism 4 and on the time shift between coordinates of angular positions of the shafts 3, 5 is fed to the computer 45. The difference between coordinates is determined accordingly by adding speeds of the input shafts 3, 5 and multiplying the result by the time shift of coordinates as follows:

$$\phi = K_1 \tau (K_2 \omega_3 + K_3 \omega_5), \tag{1}$$

wherein
- $\phi$ is the difference between coordinates of angular positions of the input shafts 3, 5;
- $\tau$ is the time period during which clocks are stored in the counter 50 between the moment of triggering of the flip-flop 49 upon arrival of a pulse from the sensor 12 to its input 37 and the moment of triggering of the flip-flop 49 upon arrival of a pulse from the sensor 29 to its input 38;
- $\omega_3$, $\omega_5$ are the angular velocities of the input shafts 3, 5;
- $K_1$, $K_2$, $K_3$ are the scale factors depending on the number of driver members 13, 30 and gear ratio of operative connections between the driver members 13, 30 and input shafts 3, 5 of the differential mechanism 4.

In this embodiment of the speed governor, the driver members 13, 30 are mounted on the shafts 3, 5 of the differential mechanism 4. It should be noted that these components may be mounted in other places as well, if necessary, such as at points located in lines of operative connections between the shafts 3, 5 and the electric motor 2 and heat engine 6, respectively, and on the shafts of the electric motor 2 and heat engine 6 proper. In addition, to enhance accuracy of measurement, several driver members instead of one may be located on the shafts 3, 5, respectively. The values of the scale factors $K_1$, $K_2$, $K_3$ depend on gear ratios of the operative connections and the number of the driver members mounted on the input shafts 3, 5.

With $K_1$, $K_2$, $K_3$ equal to unity, formula (1) will have the following form:

$$\phi = \tau(\omega_3 + \omega_5), \qquad (2)$$

With these values of the factors $K_1$, $K_2$, $K_3$, the computer 45 comprises a multiplier 51 and an adder 52 having an output connected to one input of the multiplier 51 having other inputs which are the inputs 47, 48 of the computer 45.

Figure 2:
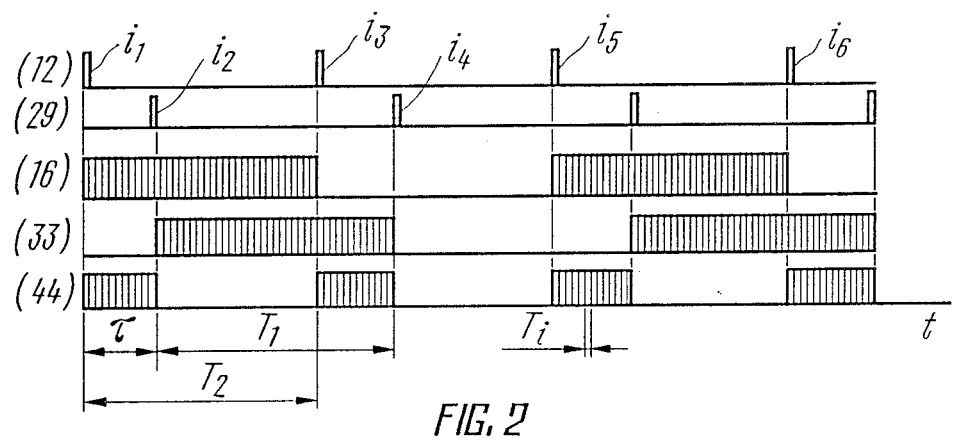
FIG. 2 shows waveform diagrams at the outputs of the position sensors of the input shafts of a differential mechanism, clock counters of means for measuring speed of the input shafts of the differential mechanism, and unit for determining time shift between angular position coordinates of the input shafts of the differential mechanism.

For a better understanding of operation of the speed governor 1, FIG. 2 shows waveforms of pulses at the outputs of the angular position sensors 12, 29, clock counters 16, 33 and unit 44 for determining the time shift between coordinates, in which time t is plotted on the abscisses and pulse levels are plotted on the ordinates.

Figure 3:
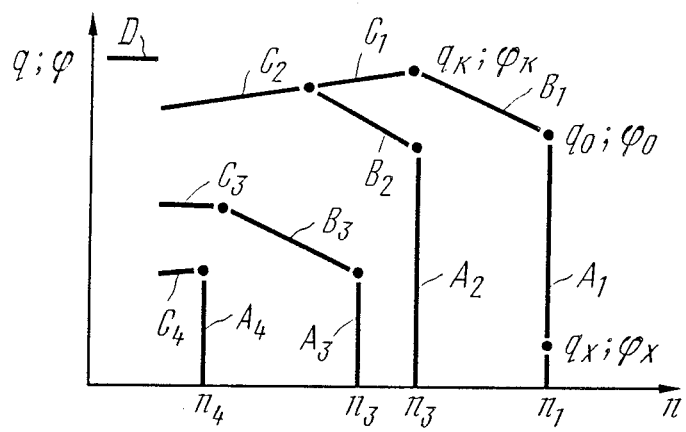
FIG. 3 shows relationships of the difference between coordinates of the input shafts of the differential mechanism and fuel supply v. heat engine speed corresponding to external and part-load speed control characteristics.

For a better understanding of the process of formation of external and part-load speed control characteristics, FIG. 3 shows relationships of the difference $\phi$ between coordinates of angular positions of the input shafts 3, 5 of the differential mechanism 4 and fuel supply q plotted on the ordinates v. speed n of the heat engine 6 plotted on the abscisses corresponding to external and part-load speed control characteristics q(n) and $\phi$(n). The speed control characteristics are divided into areas A,B,C,D, where:

- A—are the control areas of fuel supply ensuring accurate maintenance of the heat engine speed within the range of its operating modes;
- B—are the areas of fuel supply correction ensuring overload conditions of the heat engine 6;
- C—are the areas of limited fuel supply ensuring the protection of the heat engine 6 against overloads;
- D is the starting-up area of fuel supply.

Subscripts 1,2,3,4 for the abovementioned areas correspond to four positions of the accelerator of the heat engine 6. To facilitate description of operation of the speed governor 1, scales are chosen in such a manner that the speed control characteristics q(n) and $\phi$(n) be combined.

The speed governor 1 (FIG. 1) for controlling a heat engine speed functions in the following manner. The input shaft 3 of the differential mechanism 4 is rotated by the electric motor 2 at a preset speed, and the input shaft 5 is driven by the shaft 7 of the heat engine 6 in the opposite direction. With identical speeds of the input shafts 3, 5 under steady operating conditions, the output shaft 8 of the differential mechanism 4 and the fuel metering member 9 connected thereto remain stationary. Upon an increase in load of the heat engine 6, speed of the shaft 5 decreases so that the output shaft 8 starts rotating owing to a difference between speeds of the shafts 3, 5 to move the fuel metering member 9 in a direction corresponding to an increase in fuel supply. This results in an increase in speed of the shaft 7 of the heat engine 6 and input shaft 5 to a value at which speeds of the shafts 3, 5 become identical, and the output shaft and the fuel metering member 9 stop moving. Then the transient process of control is over, and the heat engine 6 continues operation under steady conditions corresponding to the initially preset speed of the electric motor 2. The speed of the heat engine 6 is similarly controlled upon a decrease in load. In this case the fuel metering member 9 will move to decrease fuel supply. With a decrease in the preset speed of the electric motor 2, the identity of speeds of the input shafts 3, 5 is broken so that the output shaft 8 and the fuel metering member 9 will move to reduce fuel supply until speed of the input shaft 5 connected to the heat engine 6 becomes equal to the new preset speed of the input shaft 3 driven by the electric motor 2. Speed of the heat engine 6 is controlled in the same manner upon an increase in the preset speed of the electric motor 2. In this case the fuel metering member 9 will move to increase fuel supply.

As the shafts 3, 5 of the differential mechanism 4 are operatively connected to the electric motor 2 and heat engine 6, their speeds are in a ratio to each other equal to the gear ratio between the shafts of the heat engine 6, electric motor 2 and differential mechanism 4. Consequently, under steady operating conditions, speed of the heat engine 6 is proportional to speed of the electric motor 2 and control of the preset speed of the heat engine 6 is ensured owing to the performance of control functions by the electric motor 2.

An electric motor speed control signal is formed in the control channel 10 in the following manner. A control signal selected by the operator is fed to the input 23 for putting in a master signal for the device 22 for forming an electric motor speed control program. The control program is formed in the device 22 in accordance with information received at the input 23, control input 40 and data input 41. Generally, the input 23 is a combination of inputs to which a number of such signals as the accelerator position (master signal), ambient temperature, coolant, oil and exhaust gas temperature, boost pressure, atmospheric pressure, transmission parameters, machine unit movement speed, difference between loads of simultaneously operating units, and other parameters may be fed. A signal controlling position of the fuel metering member 9 of the heat engine 6 in accordance with the difference between coordinates of angular positions of the input shafts 3, 5 of the differential mechanism 4 arrives at the control input 40 of the device 22. The data input 41 of the device 22 receives a signal proportional to the speed of the heat engine 6.

Depending on the signal arriving at the input 23, one or another type of program for forming external and part-load speed control characteristics of fuel supply is chosen in the memory 43 for controlling operation of the heat engine 6. The signal corresponding to the chosen control program is fed from the output of the memory 43 to the input of the comparator 42 in which the value of this signal is compared with current values of speed of the heat engine 6 and the value of the difference between coordinates of angular positions of the input shafts 3, 5 of the differential mechanism 4. Based on the comparison results, a signal corresponding to the desired position of the fuel metering member 9 is generated and fed from the output of the comparator 42 to the master input 21 of the device 19 for forming a control signal which is also the input of the comparison unit 20 of the device 19.

Speed of the input shaft 3 of the differential mechanism 4 is measured by means of the input shaft angular position sensor 12 having its generator 14 which produces a pulse upon cooperation with the driver member 13 to be fed to the flip-flop 15. The flip-flop 15 is triggered to drive the clock counter 16. Pulses are stored in the counter 16 until the driver member 13 again cooperates with the generator 14 to trigger the flip-flop 15 again and to drive the counter 16. Information on the number of pulses stored during the period of driving of the counter 16 is fed to the converter 17 converting clocks to angular velocity of rotation of the first input shaft of the differential mechanism. A signal from the output of the converter 17, which is also the output of the means 11 for measuring speed of the first input shaft, is fed to the input 18 of the device 19 for forming a control signal, i.e. to the second input of the comparison unit 20. The signal from the comparison unit 20 goes to the first input of the adder 24 where it is added to the signal fed to the correcting input 25 of the device 19 for forming a control signal, i.e. to the second input of the adder 24 from the output of the channel for correcting the electric motor speed in accordance with the heat engine speed.

The signal in the correcting channel 27 is formed in the following manner. First, speed of the second input shaft 5 of the differential mechanism 4 is measured. In the embodiment of the speed governor 1 shown in FIG. 1, speed of the second input shaft 5 is measured similarly to the measurement of speed of the first input shaft 3. The generator 31 of the angular position sensor 29 produces a pulse upon cooperation with the driver member 30 to trigger the flip-flop 32 to the first stable state in which the clock counter 33 is driven. After the next operation of the sensor 29, the flip-flop 32 is triggered to the second stable state in which the clock counter is deenergized. The period corresponding to the number of pulses stored in the clock counter 33 is converted in the converter 34 to angular velocity of rotation of the second input shaft 5. A signal from the output of the converter 34, which is also an output of the means 28 for measuring speed, goes to the input of the differentiating unit 35 for generating a correcting signal. The differentiated signal is fed from the output of the differentiating unit 35, which is also the output of the correcting channel 27, and goes to the correcting input 25 of the device 19 for forming a control signal, i.e. to the second input of the adder 24.

The signal from the output of the adder 24 goes to the input of the converter 26, and a signal from the output thereof is fed, e.g. in the form of syncs, to the electric motor 2.

Specific applications of a heat engine and machine unit as a whole call for forming external and part-load speed control characteristics of fuel supply in accordance with a predetermined law taking into account the specific application of the machine unit. It should be noted that, to enhance performance of the machine unit, it is desirable to form such characteristics with high accuracy. This requires the control of the fuel metering member 9 to be carried out in accordance with a corresponding law depending on the chosen speed of the heat engine 6 and its load.

For that purpose, the speed governor 1 has the channel 36 for controlling position of the fuel metering member of the heat engine, and a signal from the output of this channel goes to the control input 40 of the device 22 for forming a control program. Signals taken from the sensors 12 and 29 sensing angular positions of the input shafts are fed in the fuel metering member control channel 36 to the inputs 37, 38 of the device 39 for determining the difference between coordinates of angular positions of the first and second input shafts. The signal from the output of the device 39 for determining the difference carries information on position of the fuel metering member 9. This signal arrives at the control input 40 of the device 22 for forming a program, and the data input 41 of this device receives information on speed of the heat engine 6. The difference between coordinates of angular positions of the input shafts 3, 5 at a given time moment strictly determines the coordinate of angle of rotation of the output shaft 8, hence, of the fuel metering member 9 connected thereto, and the position of the fuel metering member depending, in turn, on the load of the heat engine 6.

The signal of the difference between coordinates of angular position of the input shafts 3, 5 of the differential mechanism 4 is measured in the following manner. Pulse signals generated by the angular position sensors 12, 29 are fed, via the inputs 37, 38, to the unit 44 for determining the time shift between coordinates, i.e. to the flip-flop 49. The pulse $i_1$ (FIG. 2) from the sensor 12 triggers the flip-flop 49 (FIG. 1) to the first stable state in which it is conducting, and clock pulses with the period $T_i$ go to the clock 50 (FIG. 2). The flip-flop 49 remains in this conducting state (FIG. 1) until a new pulse $i_2$ (FIG. 2) arrives thereat from the sensor 29 to trigger the flip-flop 49 (FIG. 1) to the second stable state in which it is blocked, and clock pulses cease to arrive at the counter 50. When a next pulse $i_3$ (FIG. 2) arrives at the flip-flop 49 from the sensor 12, the flip-flop again becomes conducting, and a next pulse train is stored in the counter 50 (FIG. 1) until a pulse $i_4$ (FIG. 2) arrives from the sensor 29. The number of clock pulses stored in the counter 50 (FIG. 1) with the duration $T_i$ determines the general period $\tau$ (FIG. 2) which depends on the relative position of current coordinates of the driver members 13 and 30 (FIG. 1) or the difference between coordinates of angular positions of the input shafts 3, 5. The signal corresponding to $\tau$ is fed in the digital form to the input 46 of the computer 45 having its inputs 47, 48 receiving signals from the means 11, 28 for measuring speed. The signals are processed in the computer 45 in accordance with the above formula (2). The signals arriving at the inputs 47, 48 are first added in the adder 52, whereafter the result is fed to the multiplier 51 to be multiplied by the signal corresponding to the time shift between coordinates of angular positions of the input shafts 3, 5 fed to the input 46 of the computer 45, i.e. to the input of the multiplier 51.

Angular velocities or speeds of the input shafts 3,5 are measured in the following manner. The pulse $i_1$ (FIG. 2) from the sensor 12 goes to the input of the flip-flop 15 (FIG. 1) so that the flip-flop 15 is triggered to the first stable state in which clock pulses with the period $T_i$ arrive at the input of the counter 16. The flip-flop 15 (FIG. 1) remains in this state until a next pulse $i_3$ arrives from the sensor 12 (FIG. 2) to trigger the flip-flop 15 to the second stable state in which the flip-flop is blocked, and clock pulses cease to arrive at the counter 16. When a next pulse $i_5$ (FIG. 2) arrives from the sensor 12, the flip-flop 15 (FIG. 1) again drives the counter 16 in which a next pulse train is stored until a pulse $i_6$ (FIG. 2) arrives from the sensor 12. The number of clock pulses with the duration $T_i$ (FIG. 2) stored in the counter 16 (FIG. 1) determines the total time period $T_1$ between two consecutive pulse trains arrived from the sensor 12 and depends on the angular velocity of rotation of the driver member 13 (FIG. 1) mounted on the first input shaft 3 and the input shaft 3 proper. The signal in the digital form is fed from the output of the counter 16 to the input of the converter 17, and a signal at the output thereof is equal to $1/T_1$. As a result, a signal is formed at the output of the converter 17 and, respectively, at the output of the means 11 for measuring speed, which is proportional to speed of the first input shaft 3.

The period $T_2$ (FIG. 2) for the second input shaft 5 (FIG. 1) and speed of the input shaft 5 are measured in the similar manner by means of the driver member 30, generator 31, flip-flop 32, clock counter 33 and converter 34.

The processed signal is fed from the output of the computer, i.e. from the output of the multiplier 51 to the control input 40 of the device 22 for forming a speed control program.

Now let us consider the formation of the external speed control characteristic of fuel supply of the heat engine as applied to a diesel engine in accordance with the first position of the accelerator (curve $A_1B_1C_1$ in FIG. 3). During operation of the diesel engine in the area $A_1$ under load in the range between no-load and nominal load value, the speed governor will maintain the preset speed mode $n_1$ by setting position of the fuel metering member 9 (FIG. 1) in the range from a fuel supply rate $q_x$ (FIG. 3) corresponding to no-load mode to a fuel supply rate $q_o$ corresponding to nominal load value. As the difference between coordinates of angular positions of the input shafts 3 and 5 (FIG. 1) is determined in this case by position of the fuel metering member 9, it will be set respectively within the range from $\phi_x$ to $\phi_o$ (FIG. 3). When the load of the diesel engine is greater than the nominal value, the fuel supply rate becomes higher than $q_o$, and the difference between coordinates of angular positions of the input shafts 3, 5 (FIG. 1) increases accordingly. Consequently, the signal arriving from the output of the channel 36 for controlling position of the fuel metering member at the control input 40 of the device 22 for forming a control program changes so that the diesel engine starts operating in the area $B_1$ (FIG. 3). With a further increase in the load of the diesel engine, when the fuel supply rate achieves its maximum value which is critical for the engine (point $q_k$, $\phi_k$), a signal corresponding to the value at which the diesel engine starts operating in the area $C_1$ (FIG. 3) is formed at the output of the fuel metering member control channel 36 (FIG. 1). When the diesel engine works in the area $C_1$ the fuel supply is limited.

Part-load speed control characteristics of fuel supply are formed in the similar manner with the areas $A_2$, $B_2$, $C_2$ for a second position of accelerator and $A_3$, $B_3$, $C_3$ for a third position of accelerator and the characteristic of minimum no-load speed control with areas $A_4$, $C_4$ for a fourth position of the accelerator, and the starting speed control characteristic with the area D.

Therefore the heat engine speed governor, according to the invention, in addition to high reliability, low electric motor power requirements, simple structure and high dynamic performance of a heat engine speed control, ensures high accuracy of the formation of external and part-load speed control characteristics of fuel supply in accordance with a preset law depending on load. As a result, the speed governor becomes versatile and can be used substantially in any machine unit incorporating a heat engine. This is especially true of diesel engine tractor and machine units were requirements imposed upon accuracy of the formation of external and part-load speed control characteristics of fuel supply are especially stringent.

The invention may be used in power engineering for controlling speed of internal combustion engines, preferably, diesel engines of machine and tractor units, agricultural machinery, combines, automobiles, diesel-electric units, stationary power plants, industrial tractors, construction and road-building equipment and machine units incorporating heat engines of other types such as turbines.

We claim:

1. A heat engine speed governor comprising a differential mechanism, a first input shaft of the differential mechanism being operatively connected to a unidirectional electric motor, a second input shaft being rotated by the heat engine, and an output shaft being operatively connected to a fuel metering member of the heat engine, a channel for controlling the electric motor speed, in which a means for measuring speed of the first input shaft of the differential mechanism is connected to an input of a device for forming a control signal having an output connected to the electric motor and a master input connected to an output of a device for forming an electric motor speed control program having an input for putting in a master signal, and a channel for correcting the electric motor speed in accordance with speed of the heat engine in which a means for measuring speed of the second shaft of the differential mechanism has an output connected to an input of a differentiating unit having an output connected to a correcting input of the device for forming a control signal in the electric motor speed control channel, the improvement comprising a channel for controlling position of the fuel metering member of the heat engine having sensors of angular positions of the first and second input shafts of the differential mechanism, the sensors having outputs connected to inputs of a device for determining the difference between coordinates of angular positions of the first and second input shafts of the differential mechanism, an output of the difference determining device being connected to a control input of the device for forming an electric motor speed control program, the output of the means for measuring speed of the second input shaft of the differential mechanism being connected to a data input of the device for forming an electric motor speed control program.

2. A speed governor according to claim 1, wherein the device for determining the difference between coordinates of angular positions of the first and second input shafts of the differential mechanism comprises a unit for determining the time shift between coordinates of angular positions of the first and second shafts of the differential mechanism and a computer having a first input connected to an output of the unit for determining the time shift between coordinates of angular positions of the first and second shafts of the differential mechanism and other inputs connected to the outputs of the means for measuring speed of the first and second shafts of the differential mechanism.

3. A speed governor according to claim 2, wherein the computer comprises a multiplier and an adder having an output connected to one of the inputs of the multiplier.

4. A speed governor according to claim 2, wherein the sensors of angular positions of the first and second input shafts of the differential mechanism are in the form of pulse angular position sensors, and the unit for determining time shift between coordinates of angular positions of the first and second input shafts of the differential mechanism comprises a series circuit including a flip-flop and a clock counter.

5. A speed governor according to claim 3, wherein the sensors of angular positions of the first and second input shafts of the differential mechanism are in the form of pulse angular position sensors, and the unit for determining time shift between coordinates of angular positions of the first and second input shafts of the differential mechanism comprises a series circuit including a flip-flop and a clock counter.

* * * * *